(12) United States Patent
Haas et al.

(10) Patent No.: US 9,010,239 B2
(45) Date of Patent: Apr. 21, 2015

(54) INSTALLATION FOR PRODUCING SANDWICH COOKIES AND THE LIKE

(75) Inventors: Johann Haas, Klosterneuburg (AT); Stefan Jiraschek, Königsbrunn (AT); Josef Haas, Vienna (AT); Johannes Haas, Vienna (AT); Christoph Jiraschek, Vienna (AT)

(73) Assignee: Franz Haas Waffel- und Keksanlagen-Industrie GmbH, Vienna (AT)

( * ) Notice: Subject to any disclaimer, the term of this patent is extended or adjusted under 35 U.S.C. 154(b) by 562 days.

(21) Appl. No.: 12/988,356

(22) PCT Filed: Apr. 11, 2009

(86) PCT No.: PCT/EP2009/002703
§ 371 (c)(1),
(2), (4) Date: Oct. 18, 2010

(87) PCT Pub. No.: WO2009/127380
PCT Pub. Date: Oct. 22, 2009

(65) Prior Publication Data
US 2011/0030566 A1    Feb. 10, 2011

(30) Foreign Application Priority Data

Apr. 16, 2008    (AT) .................. A 602/2008

(51) Int. Cl.
*A21C 9/04*    (2006.01)
*A21C 15/02*    (2006.01)

(52) U.S. Cl.
CPC ..................... *A21C 15/02* (2013.01)

(58) Field of Classification Search
CPC ....... A21C 15/00; A21C 15/002; A21C 15/02
USPC ............. 99/450.1, 450.4, 450.5, 450.6, 450.7
See application file for complete search history.

(56) References Cited

U.S. PATENT DOCUMENTS 2,868,141 A    1/1959  Griner
3,828,660 A *  8/1974  Mueller et al. ............... 99/450.4
(Continued)

FOREIGN PATENT DOCUMENTS

DE    1 532 908    5/1970
DE    1 532 363    5/1971
(Continued)

OTHER PUBLICATIONS

International Search Report of PCT/EP2009/002703, Dated Apr. 5, 2010.

*Primary Examiner* — Henry Yuen
*Assistant Examiner* — Brandon Harvey
(74) *Attorney, Agent, or Firm* — Laurence A. Greenberg; Werner H. Stemer; Ralph E. Locher

(57) ABSTRACT

The invention relates to a system for the production of sandwich cookies, having a suction belt conveyor (2) disposed along a sandwiching path, the sandwich cookies being created on the suction belt (11) of said sandwiching path. Successively disposed over the suction band conveyor (2) are: a cookie depositing head (17) for depositing the lower cookies onto the suction belt (11), a first cookie feeding device (3), a first inspection device (4) for the lower cookies positioned on the suction belt (11), an application head (23) of an application device (5) for applying a filling mass onto the lower cookies, a cookie depositing head (31) of a second cookie feeding device (6) for depositing the upper cookies onto the filling mass applications of the lower cookies, a second inspection device (7) for the cookie sandwiches disposed on the suction belt (11), and a calibrating device (9) for the sandwich cookies.

16 Claims, 9 Drawing Sheets

(56) References Cited

U.S. PATENT DOCUMENTS

| | | | |
|---|---|---|---|
| 4,413,462 A | * 11/1983 | Rose | 53/540 |
| 4,513,656 A | 4/1985 | Fay | |
| 5,087,464 A | 2/1992 | Eberhardt et al. | |
| 5,762,253 A | * 6/1998 | Åberg et al. | 226/95 |

FOREIGN PATENT DOCUMENTS

| | | |
|---|---|---|
| DE | 39 28 864 A1 | 3/1991 |
| EP | 0 906 726 A2 | 4/1999 |
| GB | 1 145 330 | 3/1969 |
| GB | 2350344 A * | 11/2000 |

* cited by examiner

INSTALLATION FOR PRODUCING SANDWICH COOKIES AND THE LIKE

The invention relates to an installation for producing sandwich cookies and the like.

PRIOR ART

An installation which creates sandwich cookies arranged in succession in a row from separately fed upper and lower cookies is known. This installation has a sandwiching section, along which a first cookie feeding device, furnished with a cookie hopper, for the lower cookies, a coating device, furnished with a cylindrical coating head, a second cookie feeding device, furnished with a cookie hopper, for the upper cookies, and a calibration device for the sandwich cookies are arranged in succession. Arranged along the sandwiching section is a conveying device, which is furnished with stationary sliding rails for the cookies and with finger-shaped drivers, which are fixed on a circulating endless chain and displace the cookies along the sliding rails. The conveying device provides separate sliding rails for transporting the upper and lower cookies. The conveying device provides two main sliding rails, which lead in a horizontal plane from the cookie hopper of the first cookie feeding device to the coating head of the coating device, where the lower cookies are furnished, on the top side, with a filling. Downstream of the coating head, the main sliding rails extend through obliquely downward and then horizontally for another section at some distance below the cookie hopper of the second cookie feeding device. Provided for the upper cookies above the two main sliding rails are two auxiliary sliding rails, which extend in a horizontal plane from the cookie hopper of the second cookie feeding device as far as a topping station, where the auxiliary sliding rails end and the upper cookies are deposited on the lower cookies which are furnished, on the top side, with a filling. The sandwich cookies created in the topping station are conveyed by the finger-shaped drivers of the conveying device along the main sliding rails and through a calibration station, in which the upper cookies are pushed downward slightly by a calibration device. In the process, the upper cookies are pressed against the still soft filling arranged on the top side of the lower cookies and the sandwich cookies are pressed together to a predetermined thickness.

SUMMARY OF THE INVENTION

It is the object of the invention to improve an installation of this kind.

As a solution, the invention proposes an installation in which a conveying device for the cookies is arranged along a sandwiching section and a first cookie feeding device, furnished with a cookie hopper, for the lower cookies, a coating device, furnished with a cylindrical coating head, a second cookie feeding device, furnished with a cookie hopper, for the upper cookies, and a calibration device for the sandwich cookies are arranged in succession along the sandwiching section. This installation is characterized according to the invention in that the conveying device is in the form of a suction belt conveyor, on the suction belt of which the sandwich cookies are created, in that the first cookie feeding device has an output portion which is arranged above the suction belt conveyor and in which a first cookie discharging head discharging the lower cookies individually is arranged, in that downstream of the first cookie discharging head there is arranged a first inspection device for the lower cookies deposited on the suction belt, in that, downstream of the first inspection device, the cylindrical coating head of the coating device is arranged above the suction belt conveyor, in that the second cookie feeding device has an output portion which is arranged downstream of the coating head above the suction belt conveyor and in which a second cookie discharging head discharging the upper cookies individually is arranged, and in that downstream of the second cookie discharging head there is arranged a second inspection device for the cookie sandwiches formed by the second cookie discharging head and arranged on the suction belt.

This configuration provides a significant simplification of the installation producing the sandwich cookies. In the conveying device provided for transporting the cookies, the sliding rails and the endless chain with the finger-shaped drivers fixed to it for displacing the cookies along the conveying device are dispensed with. A dedicated topping station for putting the lower cookies furnished with filling and the upper cookies together is dispensed with because the second cookie discharging head deposits the upper cookies directly onto the lower cookies furnished with filling. The first inspection device arranged downstream of the first cookie discharging head inspects the lower cookies deposited on the suction belt. The inspection may relate both to the position of the lower cookies on the suction belt and to cookies themselves. The second inspection device arranged downstream of the second cookie discharging head inspects the cookie sandwiches formed by the second cookie discharging head and arranged on the suction belt. The inspection may relate for each cookie sandwich both to the position of the upper cookie with respect to the lower cookie and to the correct arrangement of the filling and also to the upper cookie itself. If one of the inspection devices detects an error with the lower cookie, the filling application or the upper cookie, the sandwich cookie in question can be separated out on exiting the installation or on being transferred to a packaging installation.

According to the invention, the first inspection device may be furnished with an image processing sensor and check the lower cookies deposited on the suction belt by the first cookie discharging head. This configuration enables not just the position of the lower cookies on the suction belt to be checked during the inspection of the lower cookies deposited on the suction belt, but also the lower cookies themselves, for example with respect to size, shape—round, rectangular—, imperfections, cracks, etc.

According to another feature of the invention, the coating device may be furnished with a filling metering device which can be adjusted depending on the inspection result from the first inspection device. This configuration is advantageous in the event of a product change, when a change is made from one cookie size to another cookie size or from one cookie shape (rectangular) to another cookie shape (round). In this configuration, the installation automatically identifies the alteration in cookie type by means of the first inspection device and adapts the amount of filling automatically to the altered cookie size or shape.

According to another feature of the invention, the coating device may have, for the coating head, an individually activatable drive motor which, depending on the inspection result from the first inspection device, can be temporarily stopped in order to briefly interrupt the application of filling. This configuration enables the coating head of the coating device to be temporarily stopped before the lower cookie lying on the suction belt and identified as defective by the first inspection device passes the coating head. In this way, in the case of a defective lower cookie, no filling is applied to the top side thereof and the corresponding amount of filling is saved. This configuration further enables the coating head of the coating device also to be temporarily stopped if the first cookie discharging head ever deposits no lower cookie on the suction belt. In this case, too, an amount of filling intended for an individual cookie is saved at the coating device. This additionally prevents soiling of the suction belt with filling.

According to a further feature of the invention, the second inspection device may be furnished with an image processing sensor, which inspects the cookie sandwiches formed on the suction belt by the second cookie discharging head. This configuration enables the correct position of the upper cookie on the lower cookie to be checked during the inspection of the cookie sandwiches arranged on the suction belt. If this position is not correct for one cookie sandwich, the cookie sandwich in question can be separated out, for example on exiting the installation or on being transferred to a packaging installation. This configuration further enables the filling arranged between the two cookies to be checked during the inspection of the cookie sandwiches arranged on the suction belt, to see whether it is protruding beyond the edge of the upper cookie or not. This configuration further enables a check to be carried out to see whether the upper cookies, which have been deposited by the second cookie discharging head on the lower cookies lying on the suction belt and carrying a filling on the top side, include defective cookies, in which, for example, a corner is missing, or a small piece of cookie has broken off, or which are even completely broken and exhibit a breakage line. If the second inspection device detects a cookie sandwich having a defective upper cookie, this cookie sandwich can be separated out, for example on exiting the installation or on being transferred to a packaging installation.

According to a further feature of the invention it may be provided that, in order to produce sandwich cookies having an additional cookie layer, a cylindrical coating head of a second coating device, a cookie discharging head of a third cookie feeding device and a third inspection device inspecting the cookie sandwiches arranged on the suction belt are arranged in succession above the suction belt conveyor downstream of the second inspection device. This configuration of the installation according to the invention enables the production of filled 3-layer sandwich cookies, in the production of which the cookie sandwiches coming from the second cookie discharging head are furnished, on the top side, by the coating head of the second coating device with a filling, on which the cookie discharging head of the third cookie feeding device then deposits its cookies. The sandwich cookies created in this way are then checked in the third inspection device.

In an installation for producing filled 3-layer sandwich cookies, it may be provided according to the invention that the second coating device is furnished with a filling metering device which can be adjusted depending on the inspection result from an inspection device. This configuration is advantageous in the event of a product change, when a change is made from one cookie size to another cookie size or from one cookie shape (rectangular) to another cookie shape (round).

In an installation for producing filled 3-layer sandwich cookies, the second coating device may have, for the coating head, an individually activatable drive motor which, depending on the inspection result from the second inspection device, can be temporarily stopped in order to briefly interrupt the application of filling. This configuration enables the coating head of the second coating device to be temporarily stopped before the cookie sandwich lying on the suction belt and identified as defective by the second inspection device passes the coating head of the second coating device. This saves an amount of filling which corresponds to an individual cookie and would otherwise be separated out together with the defective cookie sandwich.

In an installation for producing filled 3-layer sandwich cookies, it may be provided according to the invention that the third inspection device is furnished with an image processing sensor, which inspects the 3-layer cookie sandwiches formed on the suction belt by the third cookie discharging head. This configuration enables in each case the correct position of the uppermost cookie with respect to the two lower cookies to be checked during the inspection of the 3-layer cookie sandwiches arranged on the suction belt. If this position is not correct for one cookie sandwich, the latter can be separated out, for example on exiting the installation or on being transferred to a packaging installation. This configuration further enables a check to be carried out on the 3-layer sandwich cookies with regard to the filling applied by the coating head of the second coating device, to see whether it is protruding beyond the edge of the uppermost cookie or not. This configuration further enables a check to be carried out to see whether the cookies, which have been deposited by the third cookie discharging head on the cookie sandwiches carrying a filling on the top side, include defective cookies, in which, for example, a corner is missing, or a small piece of cookie has broken off, or which are even completely broken and exhibit a breakage line. If the third inspection device detects a cookie sandwich having a defective upper cookie, this cookie sandwich can be separated out, for example on exiting the installation or on being transferred to a packaging installation.

According to a further feature of the invention, it may be provided that each cookie discharging head has a continuously moveable transfer mechanism, which is arranged at the lower end of a cookie hopper, separates the cookies emerging from the bottom of the cookie hopper and passes them individually onto the suction belt. The transfer mechanism may, according to the invention, be furnished with a rotor which rotates about a horizontal axis and has at least one cookie holder on its outer circumference. According to the invention, the rotor of the transfer mechanism may be in the form of a wheel, which has cookie holders distributed around its circumference.

According to a further feature of the invention, a cookie ejecting device assigned to the suction belt of the suction belt conveyor may be provided upstream of the calibration device. This ejecting device may be furnished with an individually activatable actuating device.

According to a further feature of the invention, it may be provided in the installation for producing sandwich cookies and the like that the suction belt conveyor has an individually activatable drive motor for the suction belt, that each coating device is furnished with an individually activatable drive motor for its coating head, that each cookie discharging head is furnished with an individually activatable drive motor for its continuously moveable transfer mechanism, and that an electronic control device, which individually activates and synchronizes the individual drive motors and is connected to all the inspection devices and the individually activatable actuating device of the ejecting device, is provided.

Such a configuration of the installation allows various operating variants. Firstly, during operation of the installation, separately created defective cookie sandwiches may be separated out of the installation automatically by means of the electronic installation controller while the installation is in operation. Secondly, the installation can be set for the respective product by means of the electronic installation controller while the installation is in operation. Thus, for example, the position of the filling application on the lower cookies or the position of the upper cookies on the filling application can be altered by means of the electronic installation controller.

If the first inspection device reports to the electronic installation controller that a defective cookie or no cookie at all has been deposited on the suction belt by the first cookie discharging head, a first operating variant provides that the coating head of the coating device is temporarily stopped by means of the electronic installation controller in order to prevent the application of filling in the case of the defective lower cookie or in the case of the empty cookie position on the suction belt. In this operating variant, the first cookie discharging head carries on running and deposits an upper cookie on the lower cookie or at the empty cookie position on the suction belt. In this operating variant, the ejecting device is activated in time-offset manner with respect to the stopping of the coating head, in order to remove from the suction belt the defective lower cookie and the upper cookie lying on it, or the upper cookie lying on the suction belt, when they pass the ejecting device. Another operating variant provides that, by means of the electronic installation controller, the first cookie discharging head is also temporarily stopped in addition to the coating head of the coating device, and the ejecting device is activated as soon as the defective lower cookie arrives at the ejecting device.

One operating variant for an installation for producing filled 3-layer sandwich cookies provides that the coating heads of the two coating devices and the cookie discharging heads of the second and third cookie feeding devices are temporarily stopped by means of the electronic installation controller if the first inspection device reports to the electronic installation controller that a defective cookie or no cookie at all has been deposited on the suction belt by the first cookie discharging head. In this operating variant, the ejecting device is activated by means of the electronic installation controller in order to remove from the suction belt the defective lower cookie passing the ejecting device.

If the second inspection device reports to the electronic installation controller that the cookie sandwich formed by the second cookie discharging head is defective, said sandwich cookie is removed from the suction belt by the ejecting device activated by means of the electronic installation controller. In such a case, in an installation for producing filled 3-layer sandwich cookies, the coating head of the second coating device is also temporarily stopped by means of the electronic installation controller. This prevents the defective cookie sandwich from being furnished with filling before it is removed from the suction belt by the ejecting device activated by means of the electronic installation controller. According to another operating variant of an installation for producing filled 3-layer sandwich cookies, in such a case, the cookie discharging head of the third cookie feeding device is also temporarily stopped by means of the electronic installation controller in order to prevent the deposition of a third cookie on the defective cookie sandwich.

If, in an installation for producing filled 3-layer sandwich cookies, the third inspection device reports to the electronic installation controller that the cookie sandwich formed by the third cookie discharging head is defective, said cookie sandwich is removed from the suction belt by the ejecting device activated by means of the electronic installation controller.

In the installation according to the invention, once they have been transferred onto the suction belt conveyor, the cookies introduced into the installation are subjected to an inspection, wherein both the lower cookies and the cookie sandwiches formed thereupon are inspected. As a result, defective lower cookies and defective cookie sandwiches can be identified and excluded from being passed on to a downstream packaging installation. This exclusion from being passed on can take place during the transfer, provided for all sandwich cookies created in the installation, to the downstream packaging installation. In the case of an installation according to the invention furnished with an ejecting device, this exclusion from being passed on can take place still within the installation according to the invention, with the result that only complete and properly formed sandwich cookies are output from the installation.

The identification of the defective lower cookies and defective cookie sandwiches can, in the case of an installation furnished with an electronic installation control device, be used, still within the installation, to temporarily stop the devices downstream of the respective inspection device, such as coating head and cookie discharging head, while the defective lower cookie or the defective cookie sandwich passes through. As a result, the production waste to be separated out together with the respective defective lower cookie or with the respective defective cookie sandwich is restricted to the defective lower cookie or the defective cookie sandwich.

BRIEF DESCRIPTION OF THE DRAWINGS

The invention is explained in more detail hereinbelow with reference to the drawings, in which.

DESCRIPTION OF THE EXEMPLARY EMBODIMENTS

Figure 1:
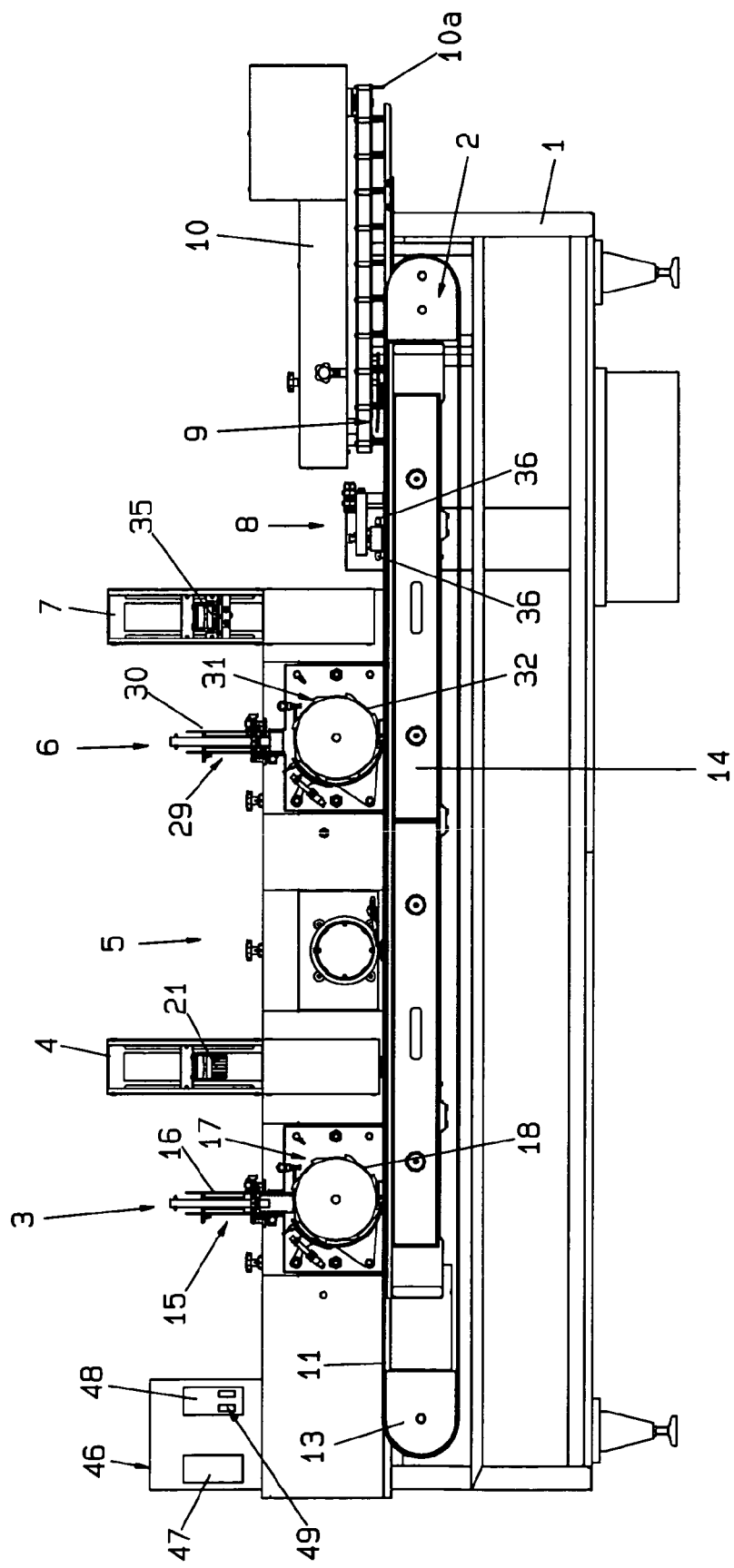
FIG. 1 shows a side elevation of a first installation for producing sandwich cookies.
Figure 2:
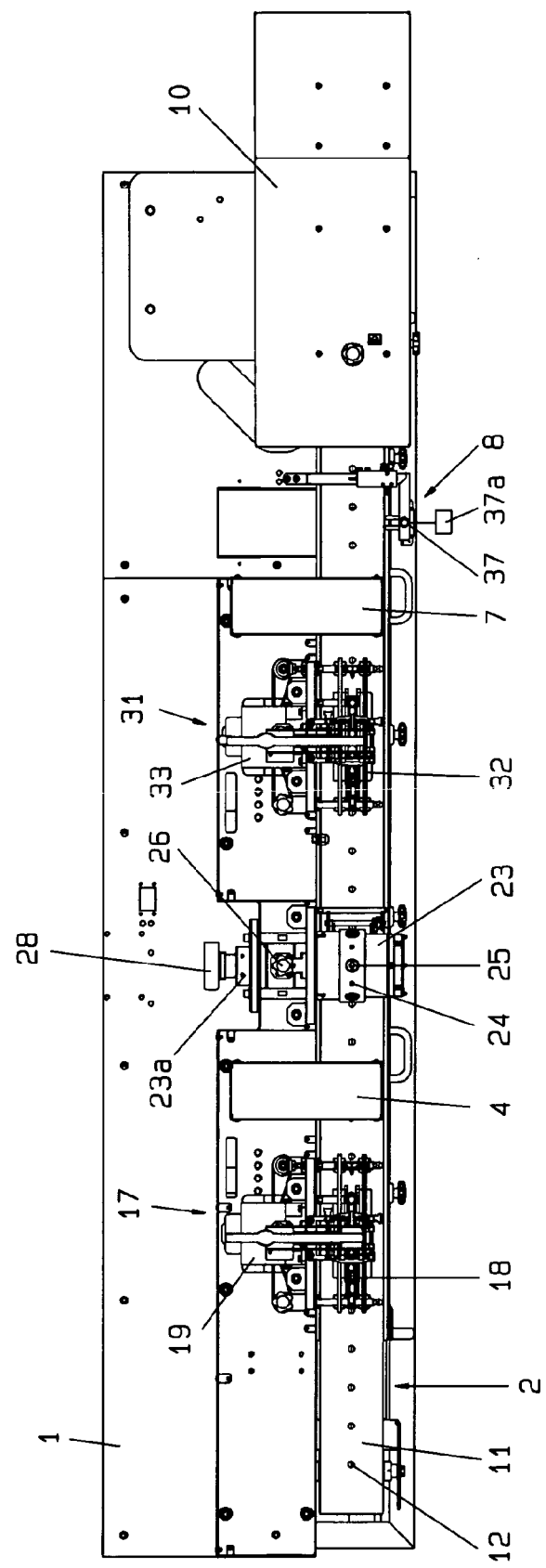
FIG. 2 shows a top view of the installation in FIG. 1.

FIGS. 1 and 2 show an installation for producing 2-layer sandwich cookies, in which a filling is arranged between the upper and lower cookies.

Arranged in the machine frame 1 of the installation is an elongate suction belt conveyor 2. Arranged in succession in the longitudinal direction along the latter are a first cookie feeding device 3, a first inspection device 4, a coating device 5, a second cookie feeding device 6, a second inspection device 7, an ejecting device 8 and a calibration device 9. The calibration device 9 is arranged within the output device 10 arranged at the end of the installation.

Figure 4:
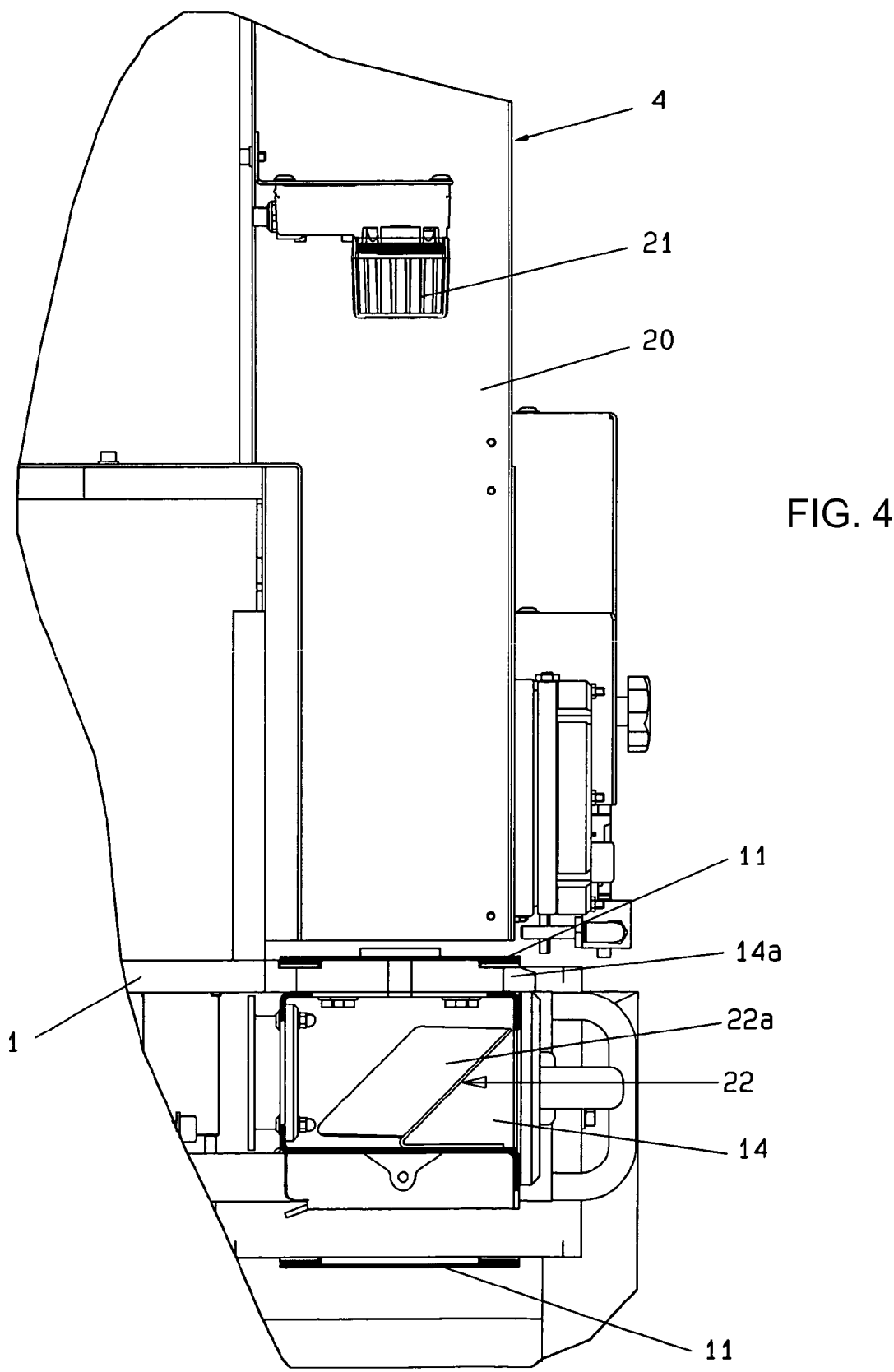
FIG. 4 shows a side elevation of a section through the installation in FIG. 1 in the region of the first inspection device.

The suction belt conveyor 2 has an endless conveying belt, which circulates in the horizontal direction, is furnished with a longitudinal row of holes 12 and is in the form of a suction belt 11. The suction belt 11 is driven by means of a drive motor 13. The suction belt conveyor 2 has a negative-pressure chamber 14, which is arranged under the upper strand of the suction belt conveyor 11. The negative-pressure chamber 14 extends in the longitudinal direction of the installation from the first cookie feeding device 3 as far as the calibration device 9 arranged in the output device 10. The negative-pressure chamber 14 is connected to a suction-draft blower which generates the negative pressure in the negative-pressure chamber 14. The negative-pressure chamber 14 is arranged in a channel, which extends in the longitudinal direction of the induced draft ventilator 2 and is covered on the top side by a planar panel 14a, on which the underside of the upper strand of the suction belt 11 bears. The panel 14a includes a longitudinal slot arranged under the holes 12 in the suction belt 11. Arranged on both lateral longitudinal edges of the panel 14a is a respective longitudinal groove into which the suction belt 11, which is in the form of a toothed belt, engages with its teeth arranged along its longitudinal edges (FIG. 4).

The first cookie feeding device 3 has an output portion arranged over the suction belt conveyor 2. The output portion 15 includes an upper cookie hopper 16 and first cookie discharging head 17, which is arranged between said upper cookie hopper 16 and the suction belt conveyor 2. The cookie discharging head 17 carries on its front side a continuously revolving cookie transfer mechanism 18, which is driven by a drive motor 19 arranged on its rear side.

The first inspection device 4 has a downwardly open shaft 20, which is arranged over the suction belt conveyor 2 and in which an image processing sensor 21 is arranged above the suction belt 11. The first inspection device 4 provides a device 22 which is arranged in the negative-pressure chamber 14 and illuminates the upper strand of the suction belt 11 from below. The planar panel 14a arranged on the top side of the negative-pressure chamber 14 is furnished, in the region of the first inspection device 4, with a cutout, through which the light projected from a light source via the mirror 22a onto the underside of the suction belt 11 falls onto the light-permeable suction belt 11. This makes the outline of the cookie lying on the suction belt 11 and any cracks it contains readily identifiable to the image processing sensor 21 arranged above the suction belt 11 (FIG. 4).

Figure 5:
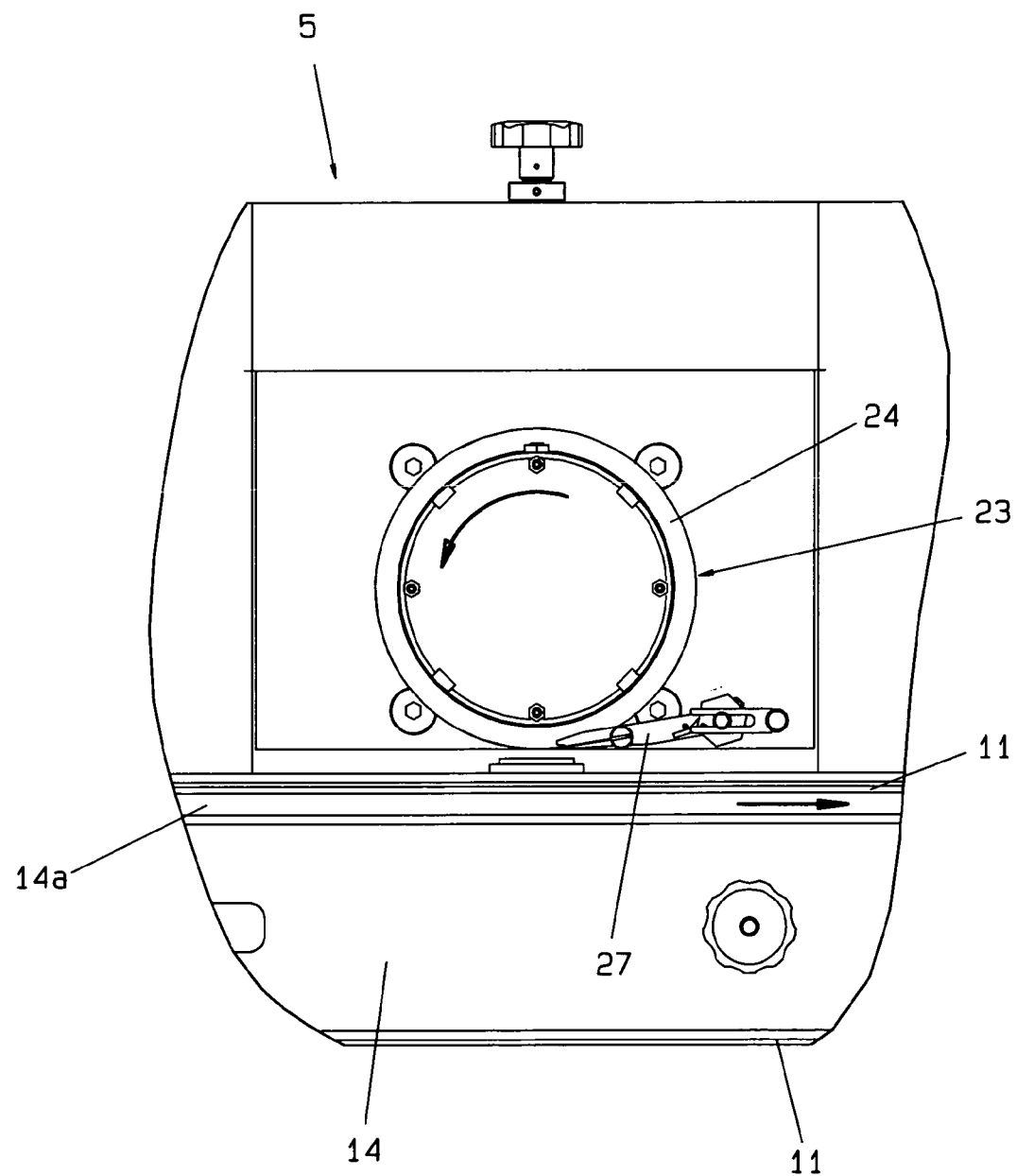
FIG. 5 shows a side elevation of a coating head.
Figure 6:
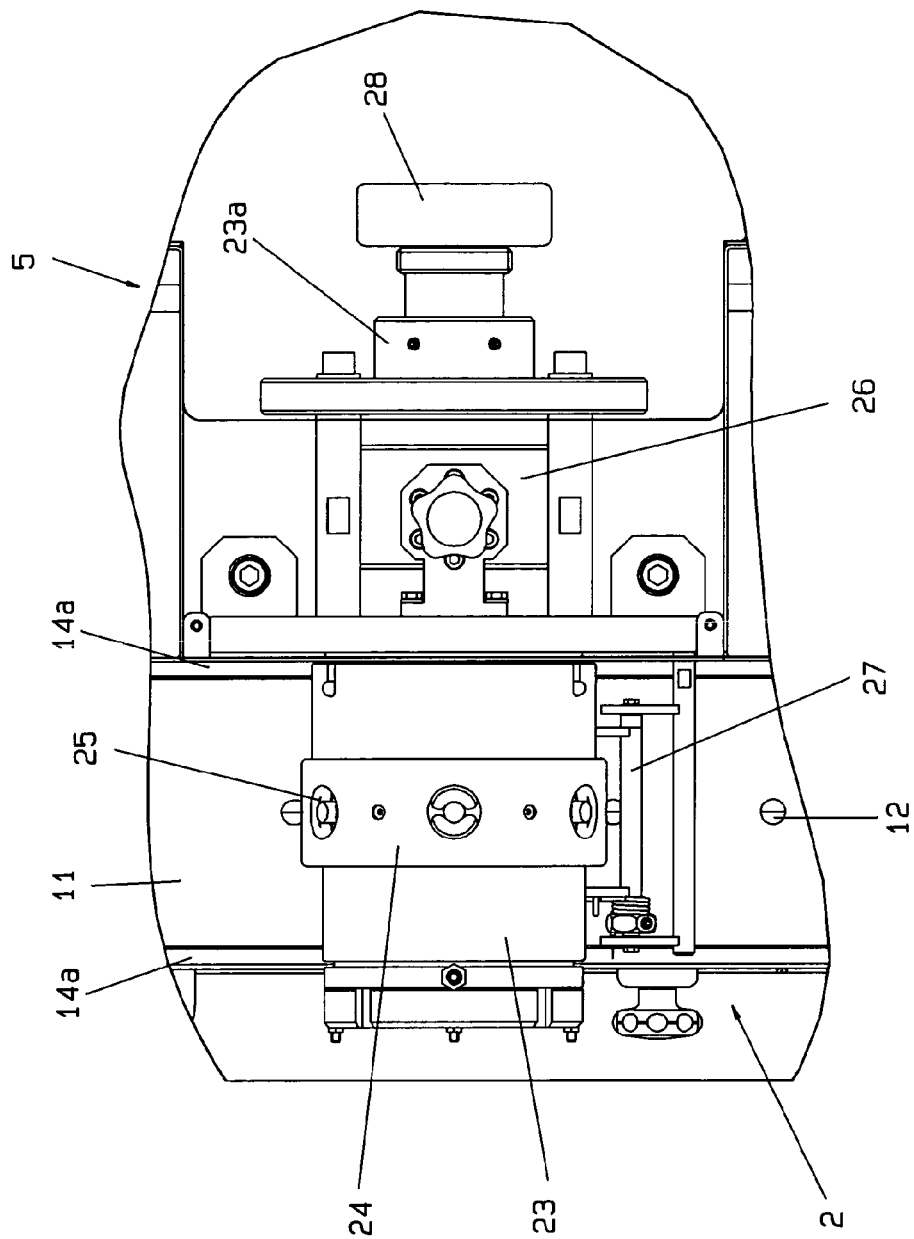
FIG. 6 shows a top view of the coating head in FIG. 5.
Figure 7:
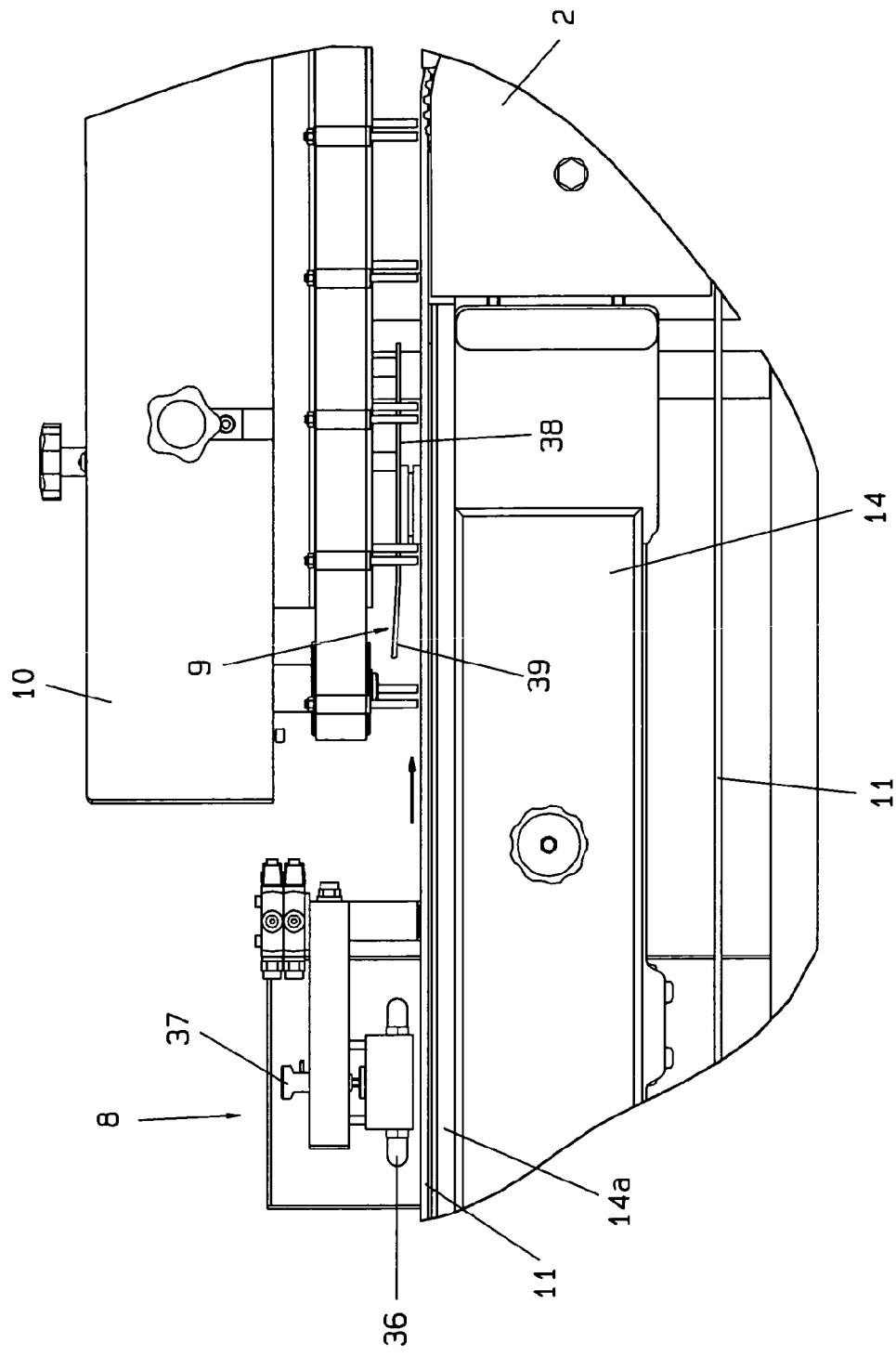
FIG. 7 shows a side elevation of the output region of the installation in FIG. 1.
Figure 8:
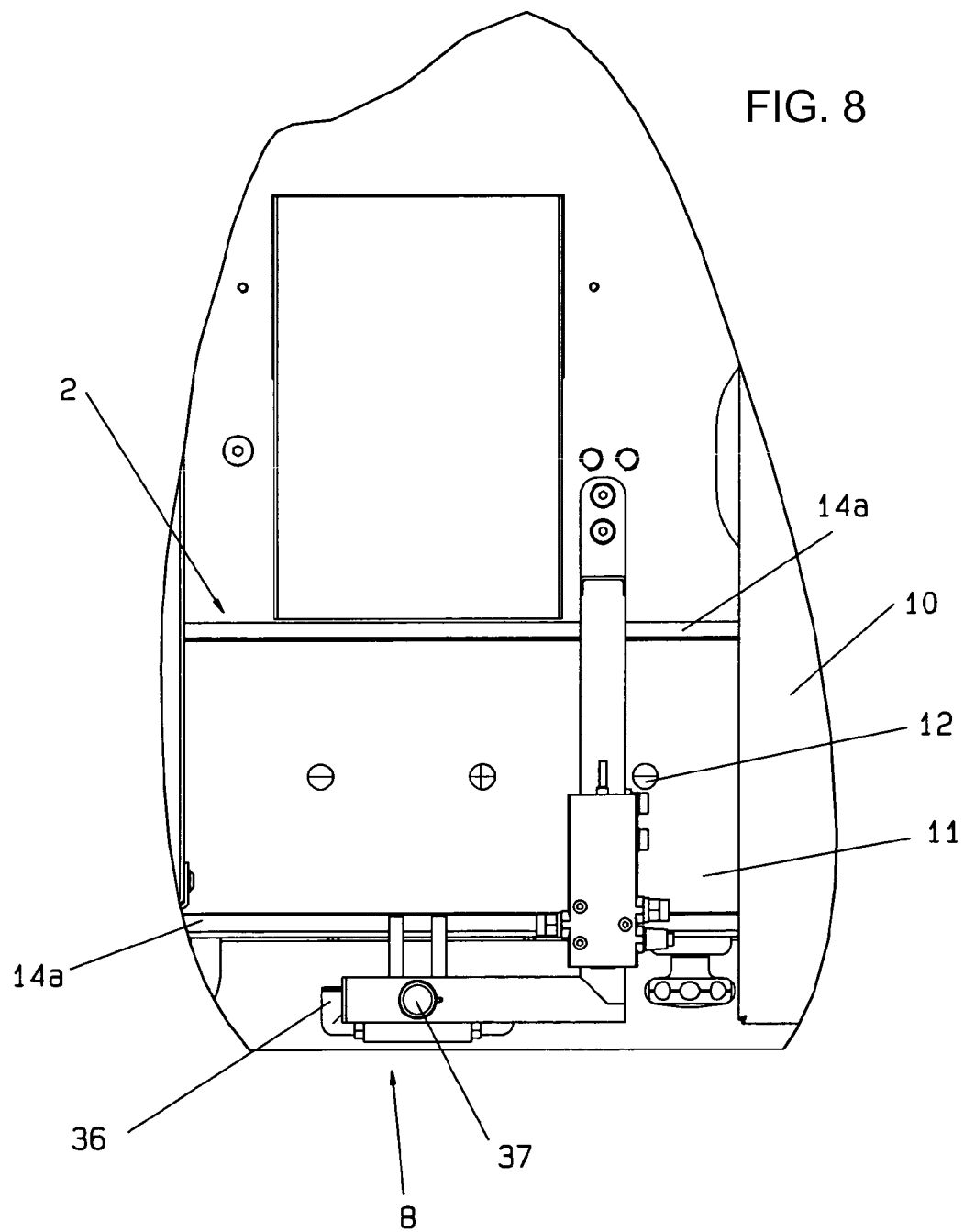
FIG. 8 shows a top view of a part of FIG. 7, FIG. 9 schematically shows a side elevation of a further installation for producing sandwich cookies.

FIGS. 5 and 6 show the coating device 5. This has a cylindrical coating head 23, which is arranged above the suction belt conveyor 2 and around the outside of which extends a cylindrical coating ring 24, which has filling outlet openings 25 arranged distributed over its circumference. The coating head 23 has a drive motor 26, which sets the coating ring 24 in rotation. On the lower vertex of the coating head 23, a scraping device 27 for the filling is arranged over the suction belt 11. Said scraping device 27 carries a wire, which bears against the coating ring 24 and separates the filling emerging from an outlet opening 25 in the coating ring 24 from the rotating coating ring 24. Provided on the rear side of the coating head 23 is a connection stub 28, to which a transporting line (not illustrated) for the filling is connected. The coating device 5 or coating head 23 can be furnished with an individually activatable metering device 23a for the filling.

The second cookie feeding device 6 has an output portion 29 arranged over the suction belt conveyor 2. The output portion 29 includes an upper cookie hopper and a second cookie discharging head 31 arranged between the cookie hopper 30 and the suction belt conveyor 2. The cookie discharging head 31 carries on its front side a continuously revolving cookie transfer mechanism 32, which is driven by a drive motor 33 arranged on its rear side.

The second inspection device 7 has a downwardly open shaft 34, which is arranged over the suction belt conveyor 2 and in which an image processing sensor 35 is arranged above the suction belt 11.

The ejection device 8 provides two blowing nozzles 36, which are arranged next to the suction belt conveyor 2 and are aligned transversely to the running direction of the suction belt 11. The blowing nozzles 36 are connected to a compressed air line, in which a shut-off valve 37 is seated and can be actuated by way of a dedicated actuating device 37a.

The output device 10 provides an endless transporting chain, which is arranged above the suction belt 11 and carries finger-shaped drivers 10a, which are arranged next to one another in pairs, protrude downwardly from the transporting chain and grasp the rear end of the sandwich cookies lying on the suction belt 11. The calibration device 9 arranged in the output device 10 provides a calibration rail 38, which is arranged at a predetermined distance above the suction belt conveyor 2, extends in the longitudinal direction of the installation and is furnished with a run-in slope 39. This calibration rail 38 is arranged in the intermediate space remaining between the two finger-shaped drivers 10a, arranged next to one another, of the output device 10. Each pair of drivers conveys, by way of its drivers 10a arranged on both sides of the calibration rail 38, a finished cookie sandwich, lying on the suction belt 11, through under the calibration rail 38. The finished cookie sandwich is pressed together to a predetermined thickness on passing the run-in slope 39 and is transferred to a subsequent device, for example to a packaging machine, after leaving the calibration rail 38.

Figure 3:
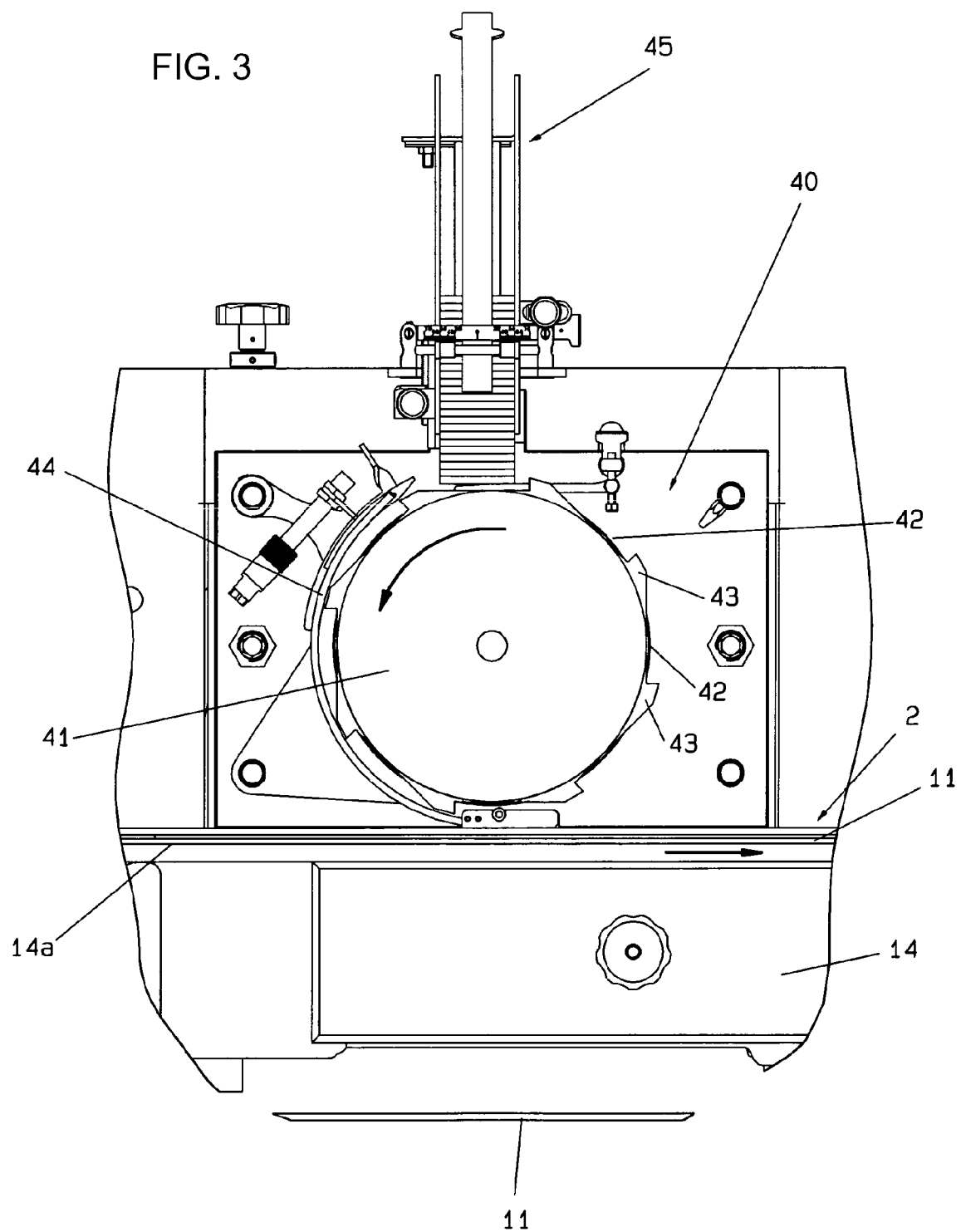
FIG. 3 shows a side elevation of a cookie discharging head.

The two cookie discharging heads 17 and 31 are of identical design. Both cookie discharging heads 17 and carry, on the front side, a transfer mechanism 18 and 32 respectively, driven by their drive motor 19 and 33 respectively, for the cookies. A transfer mechanism 40 of this kind is illustrated in detail in FIG. 3.

The transfer mechanism 40 has a rotor 41, which has a horizontal rotation axis and revolves counterclockwise. The rotor 41 is in the form of a wheel, which is furnished with a plurality of holders 42, arranged distributed over its circumference, for the cookies. The holders 42 are in each case in the form of a planar face, which is delimited at its rear end by a projection 43 protruding radially outward. Along the rear half of the rotor 41, two guide rails 44, which are curved in the form of a circular arc, are arranged next to one another. The two guide rails 44 prevent the cookies arranged along the rear half of the rotor 41 from falling out of the transfer mechanism 40 during the transferring process. Arranged between the two guide rails 44 is a lever, which is mounted pivotably at its upper end, is connected to an off switch, extends along the outside of the rotor 41 and is kept at a distance from the rotor surface by the cookies arranged there. If the cookies are missing, the lever is pivoted as far as the rotor surface and the off switch is activated, switching off the installation. Arranged above the rotor 41 is a cookie hopper 45, in which a vertical cookie stack rests on a fork-like base plate. The rotor 41 rotates counterclockwise. It engages with each projection 43 into the fork-like gap in the base plate and conveys the lowest cookie in the cookie stack rearwardly out of the cookie hopper 45. The cookie is conveyed downwardly to the suction belt of the suction belt conveyor 2 along the curved guide rails 44 by the rotational movement of the rotor 41. Both guide rails 44 carry, on the lower end, a spring plate, the free end of which protrudes into the transporting path of the cookies. The two spring plates prevent the cookie from slipping down off the planar face of the holder 42 early at the lower vertex of the rotor 41 and not being transferred to the suction belt 11 by the projection 43 arranged at the rear end of the holder 42.

The installation has an electronic control device 47, which is arranged in a switch cabinet 46 and is connected to an input device 48 arranged on the front side of the switch cabinet 46. The input device 48 has a plurality of input keys 49 for switching the installation on and off and for adjusting individual working parameters of the installation. Within the installation, the electronic control device 47 is connected to the drive motor 13 of the suction belt conveyor 2, to the drive motor 19 of the first cookie discharging head 17, to the image processing sensor 21 of the first inspection device 4, to the drive motor 26 of the coating head 23 of the coating device 5, to the drive motor 33 of the second cookie discharging head 31, to the image processing sensor 35 of the second inspection device 7 and to the actuating device 37a of the shut-off valve 37 of the ejecting device 8. In the case of a coating head 23 furnished with an individually activatable metering device 23a, the metering device 23a is also connected to the electronic control device 47.

By means of the control devices 47, it is possible, while the installation is running, to influence the position of the lower cookies on the suction belt 11, the amount and position of the filling on the lower cookies, the positioning of the upper cookies on the filling, and the actuating device 37a of the ejecting device 8, in such a way that only acceptable sandwich cookies are transferred from the installation according to the invention to a subsequent device, for example to a packaging machine.

Figure 9:
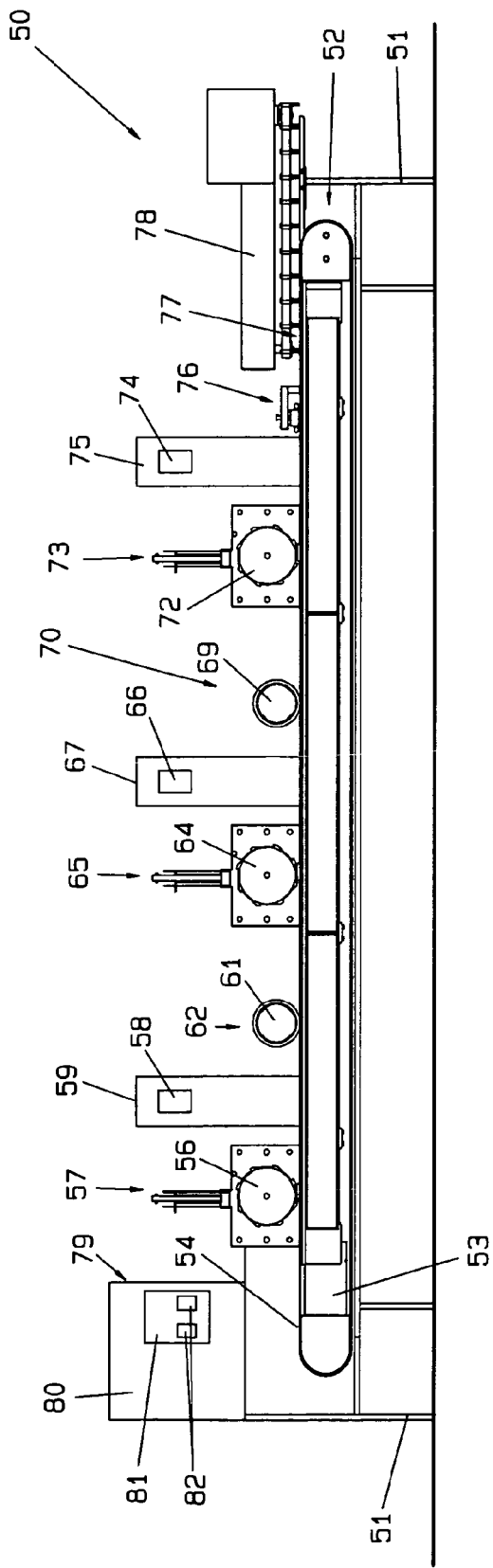
Figure 10:
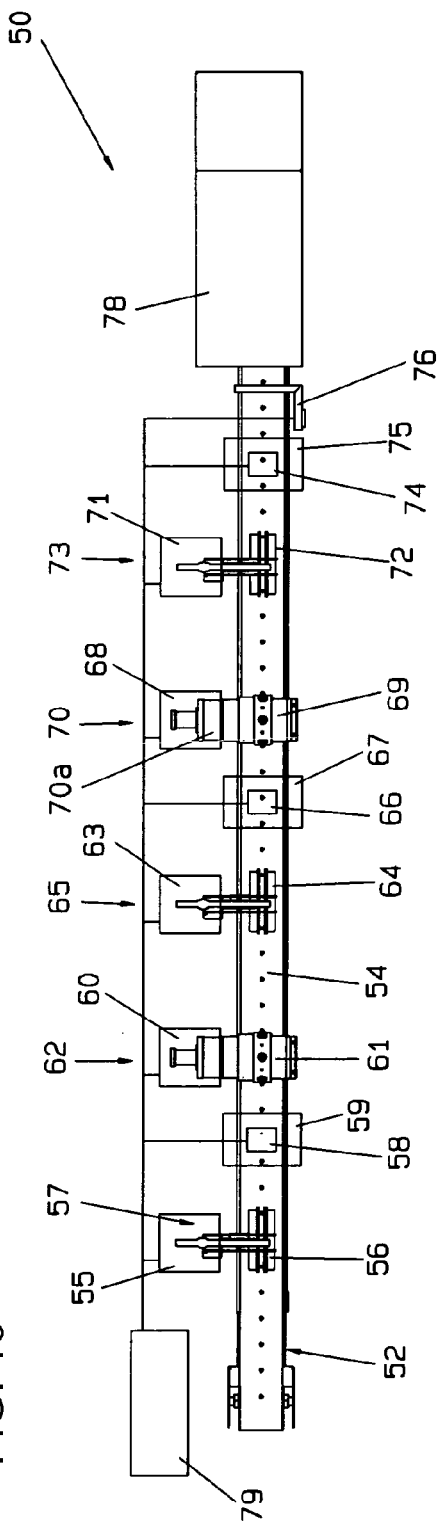
FIG. 10 shows a top view of the installation in FIG. 9.

FIGS. 9 and 10 show an installation 50 for producing 3-layer sandwich cookies. Arranged in a machine frame 51 in this installation 50 is an elongate suction belt conveyor 52, which is furnished with a dedicated drive motor 53 for its circulating suction belt 54. The design of the suction belt conveyor 52 with a negative-pressure chamber, which is arranged in a channel which extends in the longitudinal direction and is covered by a panel on the top side of the channel, corresponds to the design of the suction belt conveyor 2 of the installation in FIGS. 1 and 2.

Arranged in succession in the longitudinal direction above the suction belt conveyor 52 are the following devices. A cookie discharging head 56, furnished with a dedicated drive motor 55, of a first cookie feeding device 57. A first inspection device 59, furnished with an image processing sensor 58. A coating head 61, furnished with a dedicated drive motor 60, of a coating device 62. A cookie discharging head 64, furnished with a dedicated drive motor 63, of a second cookie feeding device 65. A second inspection device 67, furnished with an image processing sensor 66. The arrangement and configuration of these devices correspond to those of the devices with the same designations in the installation in FIGS. 1 and 2.

Arranged downstream of the second inspection device 67 in the installation 50 is a coating head 69, furnished with a dedicated drive motor 68, of a second coating device 70, which corresponds to the coating device 5 of the installation in FIGS. 1 and 2 and, just like the latter, can be furnished with an individually activatable metering device 70a for the filling. Arranged downstream of the coating head 69 of the second coating device 70 is a cookie discharging head 72, furnished with a dedicated drive motor 71, of a third cookie feeding device 73, which corresponds to the two cookie feeding devices of the installation in FIGS. 1 and 2. Arranged above the suction belt conveyor 52 and downstream of the cookie discharging head 72 of the third cookie feeding device 73 is a third inspection device 75, furnished with an image processing sensor 74.

The third inspection device 75 is followed, as in the installation in FIGS. 1 and 2, by an ejecting device 76, a calibration device 77 and an output device 78. The arrangement and configuration of these devices correspond to those of the devices with the same designations in the installation in FIGS. 1 and 2.

The installation 50 has an electronic control device 80, which is arranged in a switch cabinet 79 and is connected to an input device 81 arranged on the front side of the switch cabinet 79. The input device 81 has a plurality of input keys 82 for the switching the installation 50 on and off and for adjusting individual working parameters of the installation 50.

Within the installation 50, the electronic control device 80 is connected to the drive motor 53 of the suction belt conveyor 52, to the drive motor 55 of the cookie discharging head 56 of the first cookie feeding device 57, to the image processing sensor 58 of the first inspection device 59, to the drive motor 60 of the coating head 61 of the coating device 62, to the drive motor 63 of the cookie discharging head 64 of the second cookie feeding device 65, to the image processing sensor 66 of the second inspection device 67, to the drive motor 68 of the coating head 69 of the second coating device 70, to the drive motor 71 of the cookie discharging head 72 of the third cookie feeding device 73, to the image processing sensor 74 of the third inspection device 75 and to the actuating device of the ejecting device 76. In the case of a second coating device 70 furnished with an individually activatable metering device 70a, the metering device 70a is also connected to the electronic control device 80.

By means of the control device 80, it is possible, while the installation 50 is running, to influence the position of the lower cookies on the suction belt 54, the amount and position of the first filling on the lower cookies, the positioning of the second cookies on the first filling, the amount and position of the second filling on the second cookies, the positioning of the third cookies on the second filling, and the actuating device of the ejecting device 76, in such a way that only acceptable 3-layer sandwich cookies are transferred from the installation 50 to a subsequent device, for example to a packaging machine.

The invention claimed is:

1. An installation for producing sandwich cookies, the installation comprising:
   an elongate machine frame defining a sandwiching section;
   a first cookie feeding device having a first cookie hopper for providing lower cookies disposed in said sandwiching section of said elongate machine frame;
   a coating device having a cylindrical coating head disposed in said elongate machine frame downstream from said first cookie feeding device;
   a second cookie feeding device having a second cookie hopper for providing upper cookies disposed in said elongate machine frame downstream from said coating device;
   a calibration device for the sandwich cookies disposed in said elongate machine frame downstream from said second cookie feeding device;
   an elongate cookie conveying device disposed in said elongate machine frame, said elongate cookie conveying device having an initial portion upstream of said first cookie feeding device and extending along said sandwiching section as far as said calibration device for the sandwich cookies, said elongate cookie conveying device having a suction belt conveyor with negative-pressure chamber and a suction belt with an upper strand on which the sandwich cookies are created, said negative-pressure chamber having a planar panel covering a top thereof, said calibration device having a calibration rail disposed at a predetermined fixed distance above the suction belt conveyor for setting a same thickness of all of the sandwich cookies by pressing the sandwich cookies against the suction belt in a region of said negative-pressure chamber where an underside of said upper strand bears against and is supported by a planar surface of said planar panel having a surface area which at least spans a surface area of the sandwich cookies, as the sandwich cookies are conveyed under said calibration rail;

said first cookie feeding device having a first output portion disposed above said suction belt conveyor, said first output portion having a first cookie discharging head discharging the lower cookies individually;

a first inspection device disposed downstream of said first cookie discharging head and disposed above said suction belt conveyor for inspecting the lower cookies deposited on said suction belt;

said cylindrical coating head of said coating device, disposed downstream of said first inspection device, and disposed above said suction belt conveyor;

said second cookie feeding device having a second output portion disposed downstream of said cylindrical coating head above said suction belt conveyor, said second output portion having a second cookie discharging head discharging the upper cookies individually; and a second inspection device, disposed downstream of said second cookie discharging head, and disposed above said suction belt conveyor for inspecting the cookie sandwiches formed by said second cookie discharging head and disposed on said suction belt.

2. The installation according to claim 1, wherein said first inspection device has an image processing sensor and inspects the lower cookies deposited on said suction belt by the said first cookie discharging head.

3. The installation according to claim 1, wherein said coating device has a filling metering device which can be adjusted depending on inspection result from said first inspection device.

4. The installation according to claim 1, wherein said coating device has, for said cylindrical coating head, an individually activatable drive motor which, depending on an inspection result from said first inspection device, can be temporarily stopped in order to briefly interrupt an application of filling.

5. The installation according to claim 1, wherein said second inspection device has an image processing sensor and inspects the cookie sandwiches formed on said suction belt by said second cookie discharging head.

6. The installation according to claim 1, further comprising:
a second coating device having a cylindrical coating head;
a third cookie feeding device having a third cookie discharging head for producing the sandwich cookies with an additional cookie layer; and
a third inspection device for inspecting the cookie sandwiches disposed on said suction belt, said second coating device, said third cookie feeding device and said third inspection device disposed in succession above said suction belt conveyor downstream of said second inspection device.

7. The installation according to claim 6, wherein said second coating device has a filling metering device which can be adjusted depending on an inspection result from one of said inspection devices.

8. The installation according to claim 6, wherein said second coating device has, for said cylindrical coating head, an individually activatable drive motor which, depending on an inspection result from said second inspection device, can be temporarily stopped in order to briefly interrupt an application of a filling.

9. The installation according to claim 6, wherein said third inspection device has an image processing sensor and inspects the cookie sandwiches formed on the suction belt by said third cookie discharging head.

10. The installation according to claim 1, wherein each of said first and second cookie discharging heads have a continuously moveable transfer mechanism disposed at a lower end of said cookie hopper for separating the sandwich cookies emerging from a bottom of said cookie hopper and passes them individually onto said suction belt.

11. The installation according to claim 10, wherein said continuously moveable transfer mechanism has a rotor which rotates about a horizontal axis and has an outer circumference with at least one cookie holder on said outer circumference.

12. The installation according to claim 11, wherein said rotor of said continuously moveable transfer mechanism is in a form of a wheel having cookie holders distributed around said outer circumference.

13. The installation according to claim 10, further comprising a cookie ejecting device assigned to said suction belt of said suction belt conveyor and disposed upstream of said calibration device.

14. The installation according to claim 13, wherein said cookie ejecting device has an individually activatable actuating device.

15. The installation according to claim 13,
wherein said suction belt conveyor has an individually activatable drive motor for driving said suction belt;
wherein each said coating device has an individually activatable drive motor for said cylindrical coating head;
wherein each of said first and second cookie discharging heads has an individually activatable drive motor for said continuously moveable transfer mechanism;
further comprising an electronic control device individually activating and synchronizing said individually activatable drive motors and is connected to said first and second inspection devices; and
wherein said cookie ejecting device has an individually activatable actuating device.

16. The installation according to claim 15, wherein each of said cylindrical coating heads has an individually activatable filling metering device, and said activatable filling metering device is connected to said electronic control device.

* * * * *